United States Patent [19]
Schallig et al.

[11] Patent Number: 5,924,414
[45] Date of Patent: Jul. 20, 1999

[54] DEEP-FRYING DEVICE

[75] Inventors: Michiel A. A. Schallig; Jan H. Benedictus; Wilhelmus H. M. Bruggink, all of Drachten, Netherlands

[73] Assignee: U.S. Philips Corporation, New York, N.Y.

[21] Appl. No.: 08/889,280

[22] Filed: Jul. 8, 1997

[30] Foreign Application Priority Data

Jul. 29, 1996 [EP] European Pat. Off. .............. 96202144

[51] Int. Cl.⁶ .................................................. A47J 27/00
[52] U.S. Cl. .......................... 126/391; 99/403; 422/180
[58] Field of Search .................. 126/391; 99/403; 422/180

[56] References Cited

U.S. PATENT DOCUMENTS

| | | | |
|---|---|---|---|
| 5,029,519 | 7/1991 | Boyen | 99/403 |
| 5,209,218 | 5/1993 | Daneshvar et al. | 126/391 |

FOREIGN PATENT DOCUMENTS

| | | | |
|---|---|---|---|
| 0150516A1 | 8/1985 | European Pat. Off. | A47J 37/12 |
| 0663568A1 | 7/1995 | European Pat. Off. | F24C 15/20 |
| 4321530 | 1/1995 | Germany | F24C 15/20 |
| 375020 | 3/1991 | Japan | A47J 37/06 |
| 382413 | 4/1991 | Japan | A47J 37/12 |
| WO9002508 | 3/1990 | WIPO | A47J 37/06 |

*Primary Examiner*—Carroll B. Dority
*Attorney, Agent, or Firm*—Robert J. Kraus

[57] ABSTRACT

A deep-frying device comprising a reservoir, a discharge channel for discharging fumes, and a converter for converting volatile organic compounds into carbon dioxide and water, has a passage for the admixture of ambient air to the fumes exuded during deep-frying. This provides an improved odour reduction. In the case of upstream admixture additional oxygen is available, as a result of which a more complete conversion is achieved. In the case of downstream admixture, conversion is possible at a higher temperature without a corresponding rise in the temperature of the discharged mixture.

16 Claims, 6 Drawing Sheets

DEEP-FRYING DEVICE

BACKGROUND OF THE INVENTION

The invention relates to a deep-frying device comprising a reservoir for holding a deep-frying medium, which reservoir can be closed, a discharge device which communicates with the reservoir and which comprises a discharge channel for discharging fumes exuded during deep-frying, and a converter for converting volatile organic compounds contained in the fumes into carbon dioxide and water.

Such a deep-frying device is known from the Japanese Patent Application published under number 3-75020. The Japanese Patent Application published under number 3-82413 also discloses such a deep-frying device.

Substances which produce a distinct odour are released during the deep-frying of food. In general, this odour is not appreciated. The odour persists long after deep-frying and readily spreads to other rooms than the location where deep-frying takes place. This is particularly annoying if deep-frying is effected at home because private residences generally do not have specialized equipment for capturing odours emitted during deep-frying, and the undesired odour will spread to areas such as living rooms, bedrooms and studies.

It is common practice to use carbon filters, for example in the lid of the deep-frying device, in order to reduce odour annoyance. However, this provides only a limited reduction of the odour annoyance because carbon filters become rapidly saturated and in general also steam is emitted during deep-frying and impairs the operation of the carbon filter.

The deep-frying devices in accordance with said Japanese Patent Applications utilize another odour-control principle, i.e. the conversion of the odorous constituents in the exuded fumes into carbon dioxide and water, for which purpose a catalytic converter is used.

It is to be noted that the use of a catalytic converter to suppress odours emitted during the preparation of food is also described in other documents. The German Patent Application published under number 43 21 530 describes the use of a catalytic converter in a discharge channel connected to an extractor hood. The international Patent Application 90/02508 describes a roasting and grilling device having a catalytic converter in a discharge channel connected to a force-vented space having a bottom constructed as a roasting and grilling plate.

A drawback of the use of a converter to convert odorous constituents of substances released during deep-frying, as described in said Japanese patent documents, is that they provide only a moderate reduction of the odour annoyance.

SUMMARY OF THE INVENTION

It is an object of the invention to provide a deep-frying device which in operation provides a stronger reduction of the odour annoyance without a substantial rise in temperature of the gases emerging from the deep-frying device.

According to the present invention this object is achieved in that the discharge channel communicates with the ambience upstream of an outlet opening of the discharge channel via at least one passage, for the admixture of ambient air to the fumes exuded during deep-frying.

In operation ambient air can be admixed with the fumes exuded during deep-frying in the deep-frying device in accordance with the invention. If this is effected upstream of the converter, more oxygen—preferably an oxygen surplus—is available when the exuded fumes reach the converter, as a result of which a substantially greater part of the odorous constituents exuded during deep-frying is converted into water and carbon dioxide. If admixture is effected downstream of the converter the converter can be heated to a higher temperature so as to obtain a more effective conversion of the volatile organic substances and, on the other hand, the temperature of the emergent fumes converted into carbon dioxide and water is reduced by the admixture of comparatively cold ambient air. It is particularly advantageous to inject the air both upstream and downstream of the converter.

Thus, the emission of odorous constituents can be prevented almost completely and no or hardly any annoyance by undesired odours occurs apart from the instant at which the reservoir is opened to introduce or remove food.

The invention is based on the recognition of the fact that in a closed deep-frying device—in contrast to extractor hoods and roasting and grilling appliances where air is exhausted from an open or at least ventilated space—the gases to be treated issue from a substantially enclosed space and that, consequently, in order to obtain an optimum conversion of odorous components, provisions should be made for the admixture of extra oxygen and/or the conversion at a higher temperature. Since admixture is effected via a passage upstream of the outlet opening, air is added to the exuded fumes before they discharge into the ambience but the advantage of an enclosed tub is maintained, i.e. hardly or no fumes exuded during deep-frying can escape without treatment.

BRIEF DESCRIPTION OF THE DRAWINGS

Embodiments of the invention will now be described in more detail, by way of example, with reference to the drawings. In the drawings.

DESCRIPTION OF THE PREFERRED EMBODIMENTS

Figure 1:
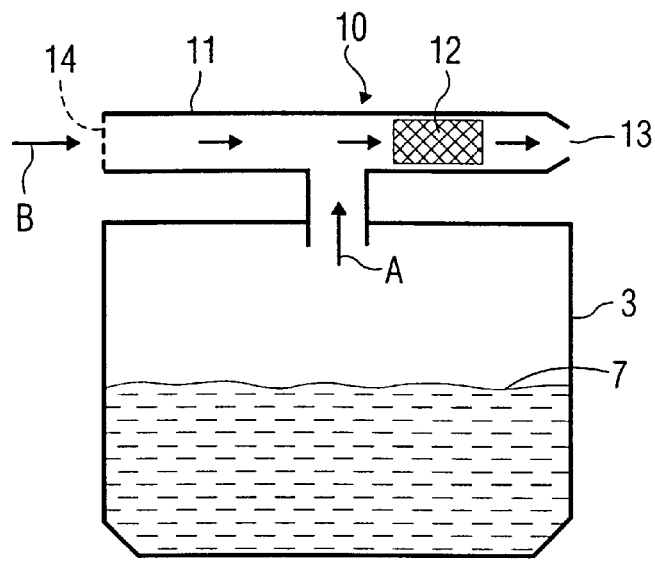
FIG. 1 shows diagrammatically a deep-frying device with an air inlet upstream of the converter.

In the drawings like parts of different embodiments bear identical reference symbols.

First of all, the invention will be described in more detail and will be elucidated with reference to diagrammatic drawings in FIGS. 1 to 3. Subsequently, a first more practical embodiment will be described with reference to FIGS. 4 to 8 and, finally, some modifications and special features will be described with reference to FIGS. 9 and 10.

Figure 2:
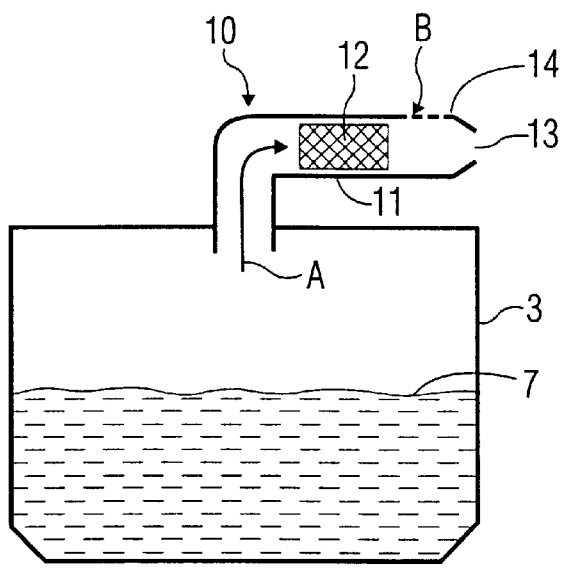
FIG. 2 shows diagrammatically a deep-frying device with an air inlet downstream of the converter.
Figure 3:
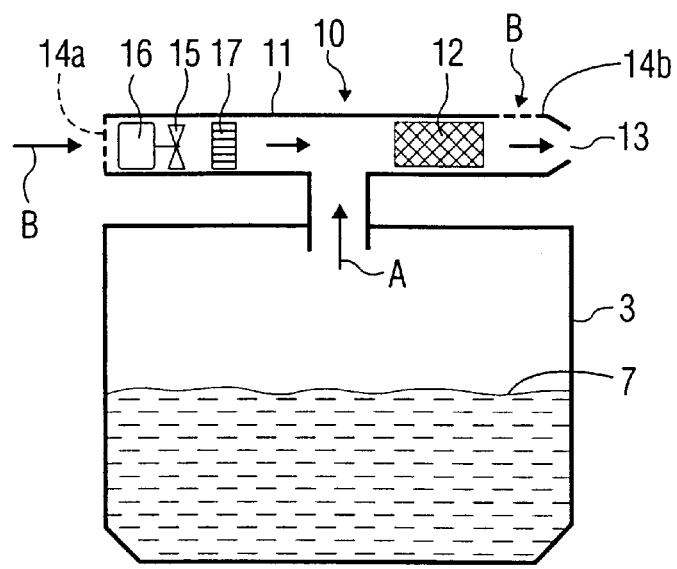
FIG. 3 shows diagrammatically a deep-frying device with an air inlet both upstream and downstream of the converter.
Figure 4:
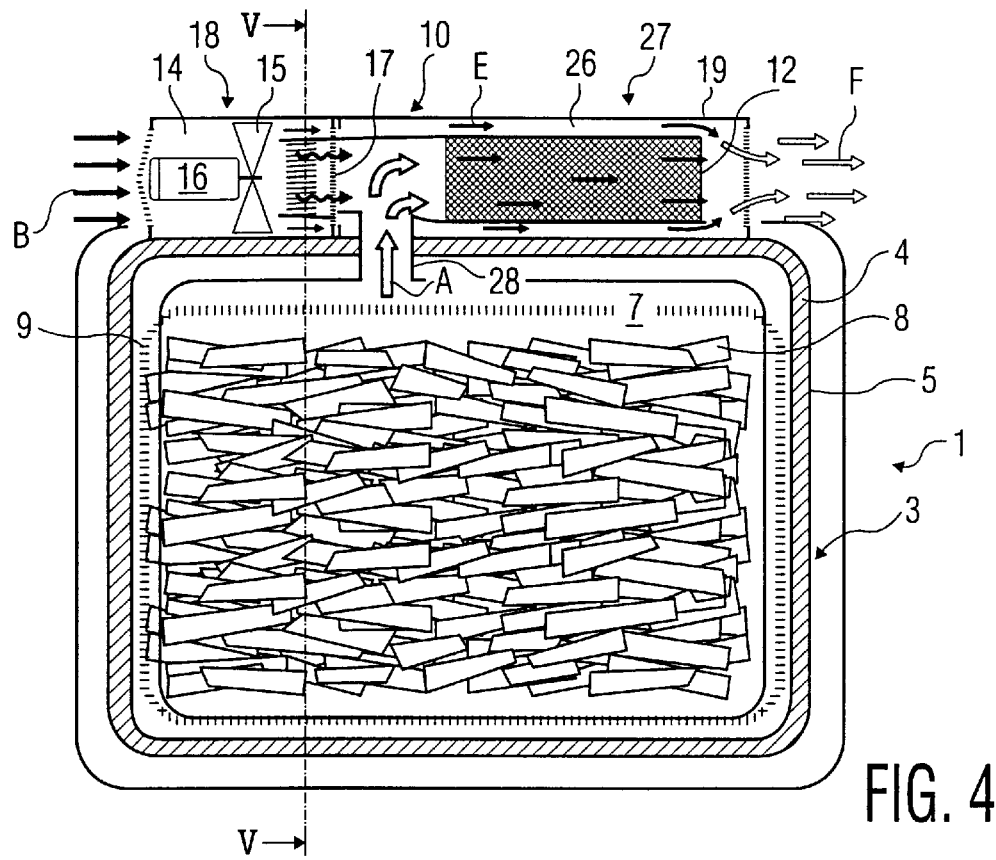
FIG. 4 is a sectional plan view taken on the line IV—IV in FIG. 5, showing a deep-frying pan in accordance with a first embodiment of the invention.
Figure 5:
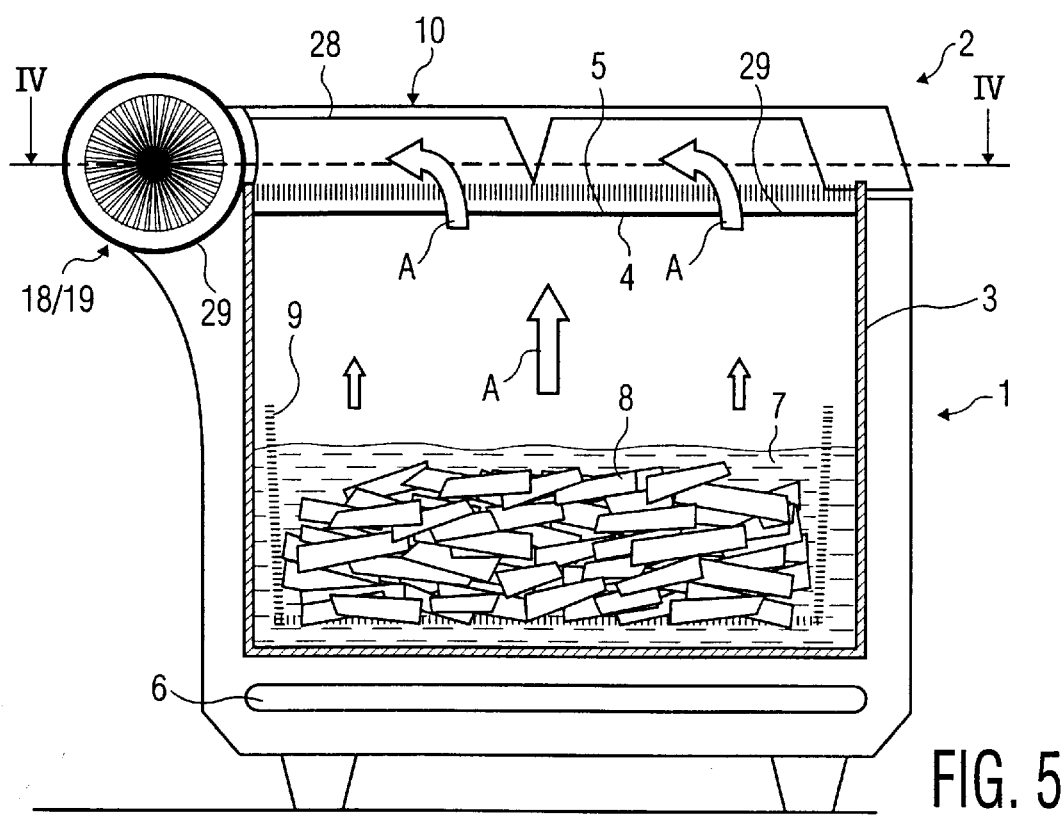
FIG. 5 is a sectional side view taken on the line V—V in FIG. 4.

The deep-frying device shown diagrammatically in FIGS. 1 to 3 comprises a reservoir or tub 3 for holding a deep-frying medium 7, which tub can be closed. For discharging the fumes A exuded during deep-frying the deep-frying device comprises a discharge device 10 with a discharge channel 11 which communicates with the tub 3. The discharge channel 11 includes a converter 12. The fumes A produced during deep-frying are led past the converter 12 and are then exhausted into the ambience via the outlet opening 13. Heating converts the volatile organic compounds in the fumes into carbon dioxide and water. In FIG. 1 the discharge channel 11 has a passage 14, upstream of the converter 12, for the admixture of ambient air B. This raises the oxygen percentage of the fumes, resulting in a better conversion when heated. In FIG. 2 shows the discharge channel 11 has a passage 14, downstream of the converter 12, for the admixture of ambient air B. The fumes can then be heated to a high temperature, which provides a better conversion, while owing to the subsequent admixture of comparatively cold ambient air the vapors emerging from the outlet opening are cooled to an acceptable temperature level. FIG. 3 shows a combination of the embodiments shown in FIGS. 1 and 2, i.e. the admixture of ambient air is effected both upstream and downstream of the converter 12 by means of passages 14a and 14b, respectively. In FIG. 3 the discharge channel 11 further includes a fan 15 driven by a motor 16 and a heating element 17 with a catalytic converter 12 for the intake of ambient air B via the passage 14a and the subsequent heating of this ambient air so as to ensure an effective conversion in the catalytic converter. The catalytic converter boosts the conversion, which enables the converter to be operated at a lower temperature while yet providing a satisfactory conversion.

FIGS. 4 to 7 show a more practical first embodiment of a deep-frying device. The deep-frying device comprises a tub unit 1 and a lid 2. The tub unit, which serves as a kind of base unit, comprises a reservoir in the form of a tub 3, which can be closed by the lid 2. The lid 2, which is shown in its mounted position in which it closes the tub 3, has a sealing rim 4 which adjoins an upper rim 5 of the tub 3 when the lid 2 has been placed onto the tub unit 1. The sealing rim 4 can be made, for example, of a flexible heat-resistant rubber, a metal or another material. The tub unit further accommodates a heating element 6 for heating the deep-frying fat in the tub 3, which heating element is preferably controlled thermostatically.

The deep-frying device is shown in an operating condition with a deep-frying medium in the form of frying fat 7 in the tub 3 and food immersed in the frying fat 7, which food is formed by chips 8 to be fried in a frying basket 9. Instead frying fat it is possible to use, for example frying oil or a broth as the medium in which the product to be prepared is immersed. As is known per se, the frying basket 9 is preferably coupled to a lifting mechanism, not shown, for lowering the food to be prepared into the oil while the tub 3 is closed by the lid 2.

A connecting channel 28 connects the tub 3 to a discharge channel 11 for discharging fumes (symbolized by arrows A) produced during deep-frying. The discharge channel includes a converter in the form of a catalytic converter 12 for converting volatile organic compounds into carbon dioxide and water.

Upstream of the converter 12 the discharge channel 11 communicates with the ambience via a passage 14 for the admixture of ambient air (arrows B) to the fumes A exuded during deep-frying. Since the admixed ambient air adds oxygen to the fumes A exuded during deep-frying the converter can effect a more complete conversion of the odorous constituents in these fumes into carbon dioxide and water than in the case that only the fumes exuded during deep-frying are led from the closed tub 3 past the converter. Since the lid then seals the tub substantially hermetically, only a very small portion or nothing at all of the fumes exuded during deep-frying can escape directly from the reservoir 3 without being treated.

The passage 14 in the discharge channel 11 is disposed upstream of the connection of the connecting channel 28 to the tub. Since the connecting channel 28 has a given length the ambient air B, and hence the oxygen, is prevented from reaching the space above the fat in the tub 2, or is at least limited to amounts without any practical significance, thereby precluding or at least considerably restraining faster aging of the hot frying fat by reaction with oxygen from the ambient air to be admixed. The extensive activities in the field of the (further) development of anti-oxidants for frying fat shows that aging of frying fat and the attendant increase in the emission of undesired odorous substances constitutes a major problem.

For the forced supply of the ambient air to be admixed the discharge device 10 in the present example comprises a fan 15 driven by a motor 16. Owing to the use of a motor-driven fan the rate at which the air is admixed can be controlled properly. This rate can be constant, can have a given variation as a function of time starting from the immersion of a load of food to be fried, or can be controlled in dependence on the emission produced during deep-frying. Since the fan 15 is disposed upstream of the connection to the connecting channel 28 it is situated in the comparatively cool stream of air to be admixed and is not soiled in use by the substances emitted during deep-frying. However, in principle this advantage can also be obtained if the fan is arranged downstream of the passage.

The heating element 17 is also disposed in the discharge channel 11. By means of this element at least a part of the ambient air B drawn in by the fan 15 is heated so as to obtain heated ambient air which is admixed with the fumes A exuded during deep-frying downstream of the heating element 17. Owing to this arrangement this heating element 17 is also disposed in the comparatively cool air stream in operation. As a result of this, there is a comparatively large temperature difference between the passing air to be heated and the heating element during operation. This difference is, for example, larger than the temperature difference between the heating element and the fumes exuded during deep-frying. For a given heat-exchanging area the large temperature difference results in a correspondingly intensive heat transfer. Moreover, the location of the heating element 17 in the discharge channel 11, i.e. upstream of the connection to the connecting channel 28, has the advantage that, just like the fan, this element is not soiled by the fumes exuded during deep-frying. A further advantage of heating the coldest gases is that, in order to obtain a given temperature of the mixture of heated ambient air C and fumes A emerging from the deep-frying tub 3 at the location of the catalytic converter 12, the maximum gas temperature in the discharge channel 11 is lower than if the hottest gas mixture A would first be heated further and would then be mixed with ambient air B. This is advantageous, inter alia, because it enables less stringent requirements to be imposed on the heat resistance of the materials of the walls of the discharge channel.

Moreover, this precludes possible smoke emission, which can in principle be produced in that fat settles on the heating element 17. The heating element 17 can be an element of the type generally used in hair-driers and paint strippers.

Suitable catalysts are known from the publications mentioned in the introductory part and are commercially available. When the catalytic converter 12 is present the desired reaction, in which the odorous constituents in the fumes exuded during deep-frying are converted into water and carbon dioxide, is already obtained at a lower temperature than in the case that the conversion is effected merely by heating. This lower reaction temperature is advantageous owing to, firstly, the lower temperature of the gases emerging from the discharge channel 11 and the correspondingly smaller risk that the user burns himself on these gases, secondly, the smaller thermal load of the parts of the device adjacent the discharge channel 11 and, thirdly, the lower power required to heat the fumes to be converted.

Figure 6:
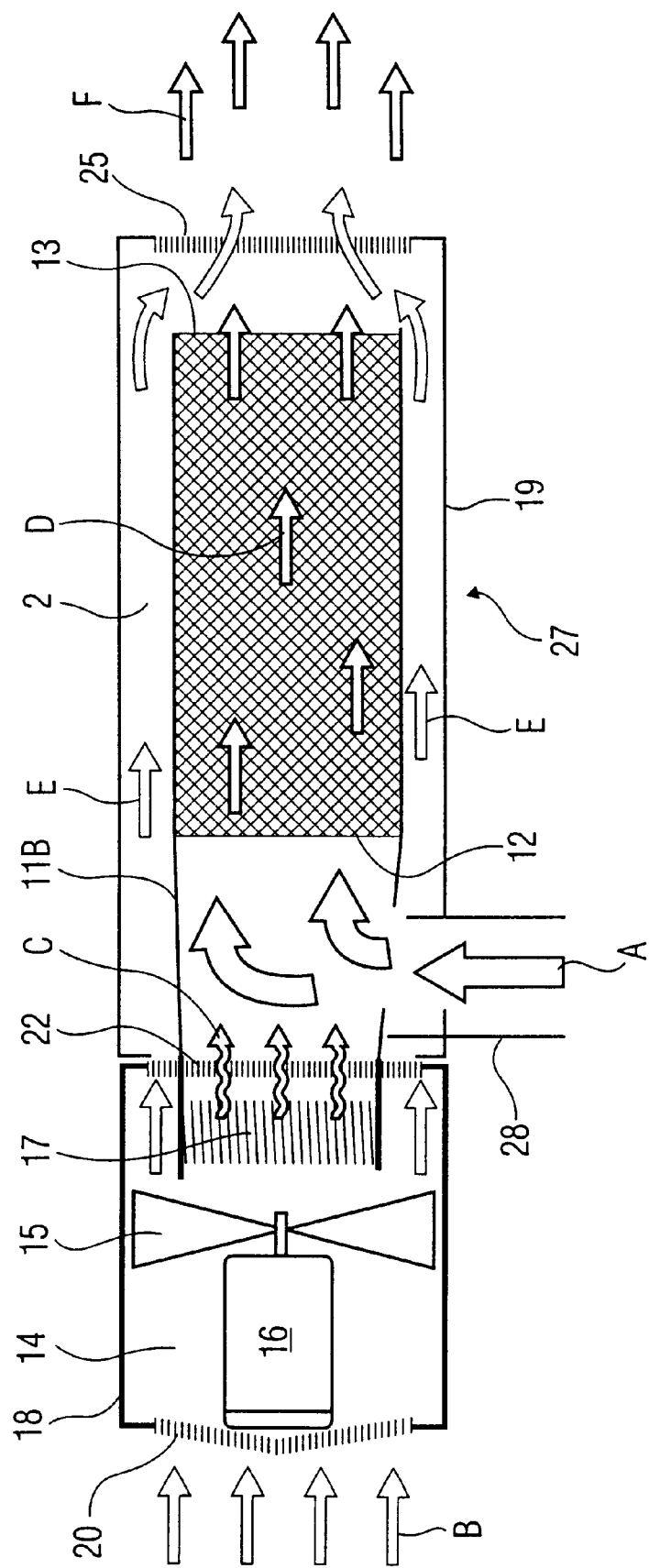
FIG. 6 is an enlarge-scale plan view of the discharge device shown in FIG. 5.
Figure 7:
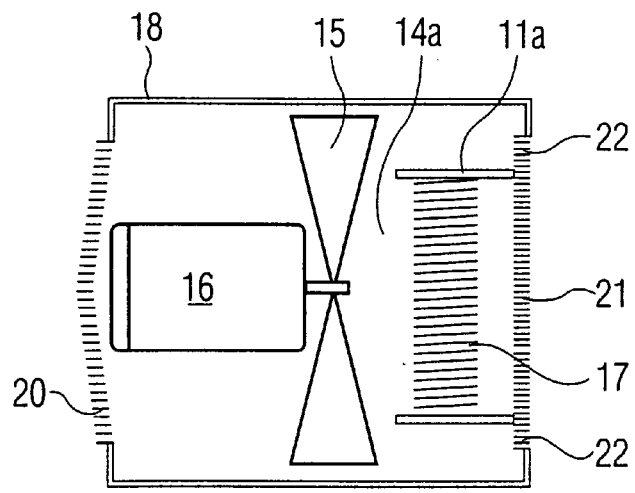
FIGS. 7 and 8 shows separate parts of the discharge device shown in FIG. 6.
Figure 8:
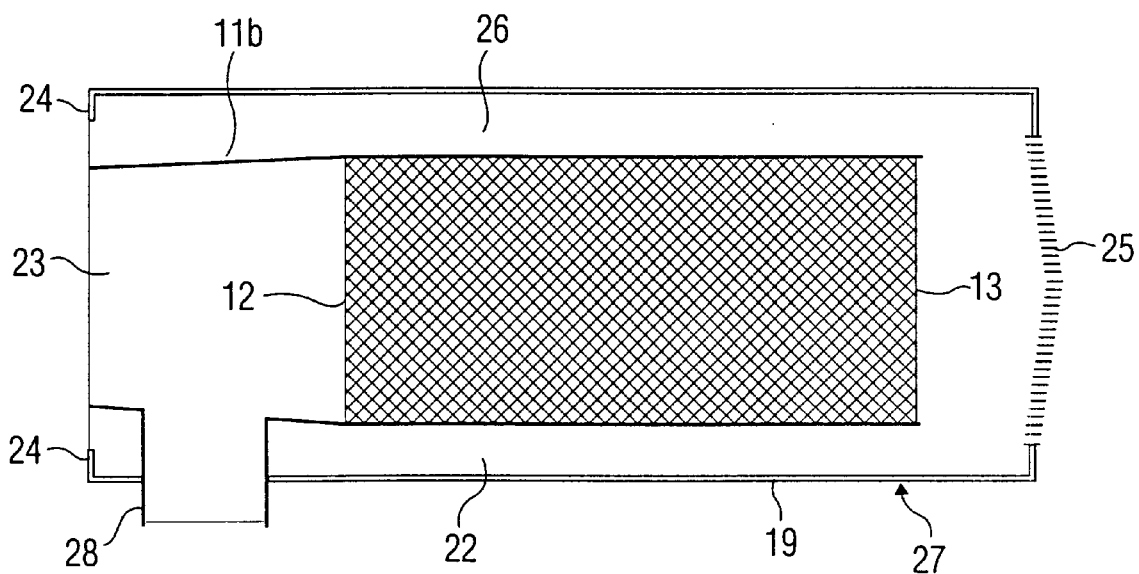

FIGS. 6–8 show the discharge device to an enlarged scale. The discharge channel 11 is surrounded by two housing sections 18, 19. The discharge channel 11 has two parts 11a, 11b. The smaller part 11a is situated in the housing section 18 and the larger part 11b in the housing section 19. The housing section 18 has an inlet opening 20 for the intake of cold ambient air and two outlet openings 21, 22, the outlet opening 21 in fact being constituted by the outlet opening of the smaller part 11a of the discharge channel and the outlet opening 22 being formed by the opening between the discharge-channel part 11a and the housing section 18. The housing section 18 further accommodates the fan 15 which is driven by the motor 16. The heating element 17 is mounted in the discharge-channel part 11a near the inlet 14a. The housing section 19 has two inlet openings 23, 24. The inlet opening 23 is formed by the inlet opening of the discharge-channel part 11b and the inlet opening 24 by the opening between the discharge-channel part 11b and the housing section 19 surrounding this part. Downstream of the outlet opening 13 of the discharge channel the housing section 19 has an outlet opening 25. The connecting channel 28 is connected to the discharge channel 11b. The discharge channel part 11b further includes the catalytic converter 12. The housing section 19 with the discharge channel part 11b and the catalytic converter 12 are detachably mounted on the deep-frying device. In the assembled operating condition the two outlet openings 21, 22 of the fixed housing section 18 adjoin the two inlet openings 23, 24 of the detachable housing section 19.

In operation the fan 15 draws cold ambient air B into the housing section 18 via the inlet opening 20. A part C of the ambient air is centrally injected into the discharge channel 11, where it is heated by the heating element 17. The air thus heated is mixed with the fumes A from the connecting channel 28 and led to the catalytic converter 12, where the volatile organic compounds are converted into carbon dioxide and water. The remaining part E of the ambient air is injected into the space 26 between the housing section 19 and the discharge channel 11b through the outlet opening 22 and immediately after the outlet opening 13 it is mixed with the fumes converted into carbon dioxide and water, the mixture being cooled to an acceptable temperature level and leaving the discharge device via the outlet opening 25.

Since the housing section 19, into which the fumes exuded during deep-frying are passed and which is therefore soiled comparatively rapidly, is detachable this section, which functions as a separate converter unit 27, can simply be removed and can be cleaned as a separate element, for example in a washtub or a dish-washer. Moreover, this reduces the risk that water and detergent get into the tub 3 during cleaning. In general, the catalytic converter 12 can remain in place during cleaning of the converter unit 27. Obviously, it is also possible to make the catalytic converter separately detachable, as a result of which it may be cleaned even better.

Since only ambient air B is passed through the fixed housing section 18 this section is hardly soiled, as a result of which this section may readily be affixed to the deep-frying device. Therefore, the electrical components 12, 15 and 16 are accommodated in this housing section 18, which is not soiled rapidly.

Since comparatively cool ambient air E flows through the intermediate space 26 the relevant housing section 19 remains cool on the outside, which minimizes the risk of burning for the user and other persons.

It is to be noted that the housing section 18 also remains comparatively cool because an intermediate space is present between the discharge channel part 11a, in which the heating element 17 is disposed, and the housing section 18.

The lid 2 of the deep-frying device shown in FIGS. 4–7 is hingeable relative to the tub unit 1. The discharge device 10 is integrated in the hinge 29 formed by the fixed housing section 18 and the detachable housing section 19. During deep-frying this hinge will generally be remote from the user and when the lid 2 is opened it is actuated from the side opposite the hinge. Thus, the discharge device, from which comparatively warm air emerges in operation, is arranged in such a manner that there is little risk that the user inadvertently comes into contact with the emerging gases.

A splash guard in the form of a grid 30 (see FIG. 5) is mounted in the lid to prevent spatters of fat produced during deep-frying from reaching the converter, which would adversely affect the operation. However, it is obvious that instead the splash guard any other know or new means, such as a gauze or filter, can be used to catch spatters.

Figure 9:
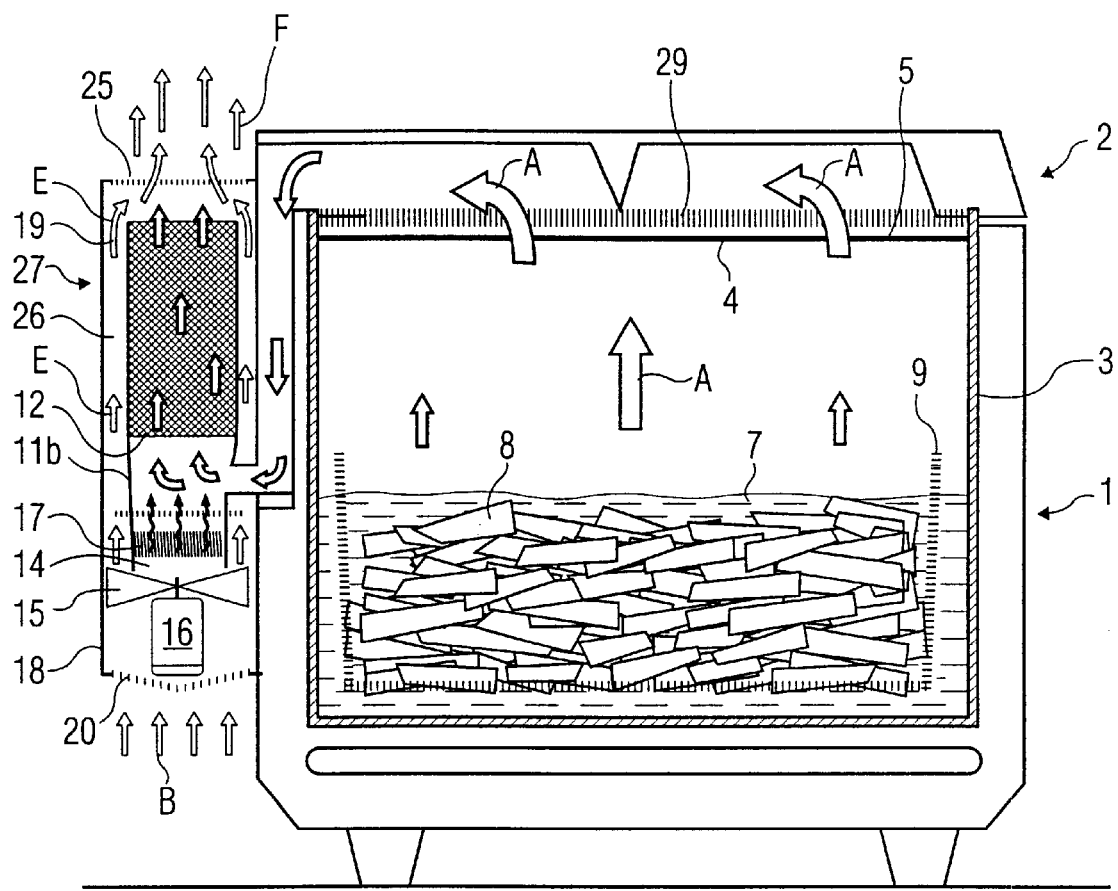
FIG. 9 is a sectional side view of a deep-frying device in accordance with a second embodiment.

In the second example of a deep-frying device shown in FIG. 9 the discharge device 10 is disposed at the rear of the tub 3. The connecting channel 28 extends downward from the lid 2 on the outside of the tub 3 and opens into the vertical discharge channel 11. The inlet opening 20 is disposed at the bottom and the warm fumes emerge from the outlet opening 25 in a vertical direction at the top. The deep-frying device in accordance with the present example occupies a slightly greater area but has the advantage that the risk of damage or burns as a result of the emerging hot air is minimal.

Figure 10:
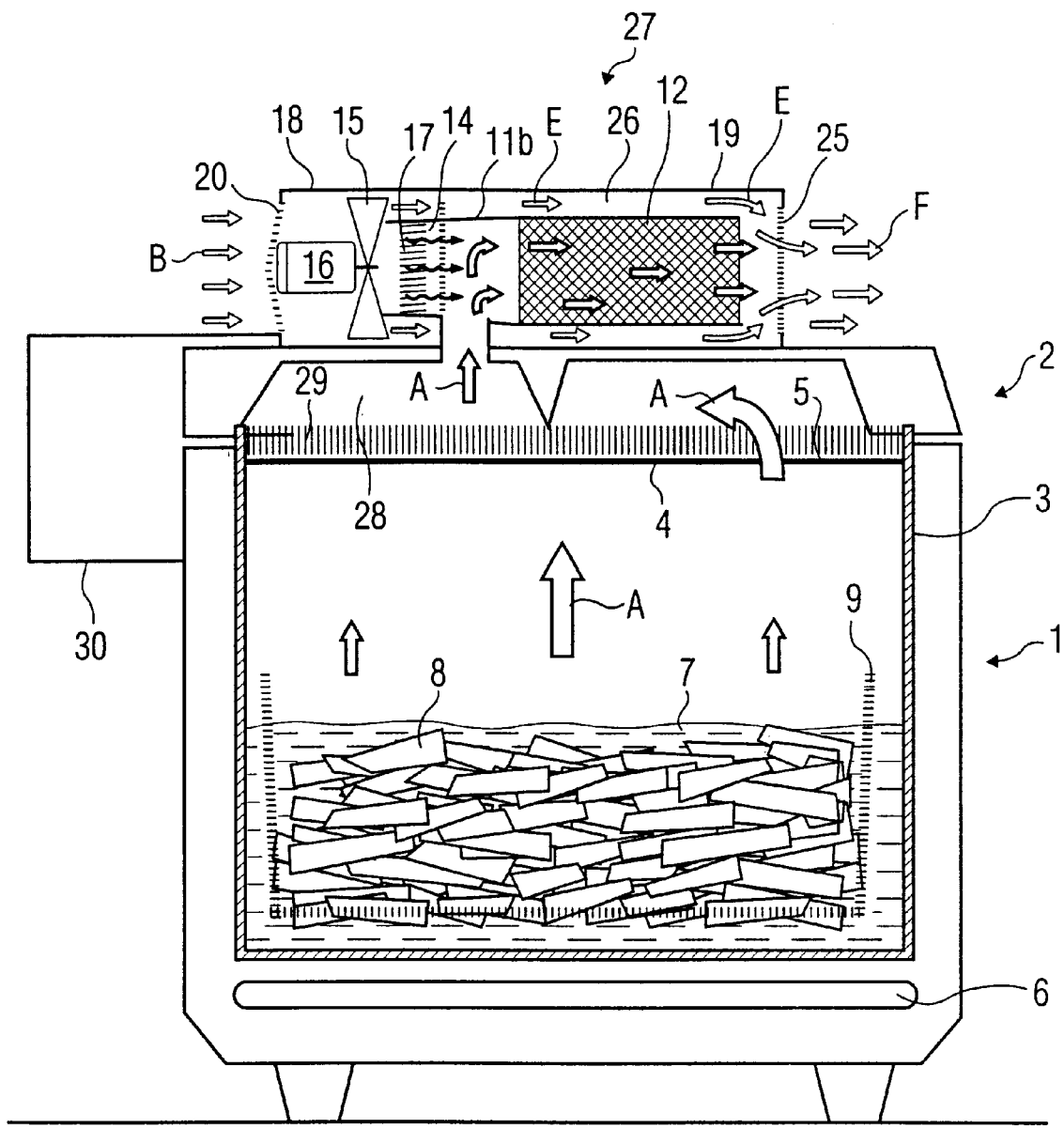
FIG. 10 is a sectional side view of a deep-frying device in accordance with a third embodiment.

In the deep-frying device shown in FIG. 10 a part of the discharge device is again detachable. In the deep-frying device in accordance with this third example the discharge device 10 is integrated in the lid 2. The motor/fan 16/15 and the heating element 17 are now accommodated in a housing section 18 which is detachable from the lid 2, so that the lid 2 including the discharge channel 11b which extends through the 11d and the catalytic converter 12 can be cleaned without the risk of the electrical components 12, 15 and 16 being damaged under the influence of moisture. The live parts of the electrical components in the housing section 18 are connected to a current inlet in the tub unit 1 by a cable which is shown diagrammatically as a line 31.

An advantage of the construction of the discharge device as a lid is that it is also possible to supply the lid 2 in the form of a discharge device to replace a lid of an existing deep-frying device or as an optional accessory to take the place of a conventional lid.

The converter unit 27 can alternatively be constructed as a replacement for an existing filter unit. Preferably, the converter unit constructed as a replacement for a lid or filter has a cord 31 with a plug, enabling it to be connected directly to the electric mains. In principle, the housing and the converter can also be supplied in the form of an element as a replacement or an optional alternative for a filter cartridge of an existing deep-frier.

It will be evident to those skilled in the art that many other variants than those described are possible within the scope of the present invention. The inlet for the admixture of ambient air can terminate, for example, in the space between the tub and the outer wall of the deep-frying device, as a result of which the ambient air is preheated to some extent. The invention can also be utilized in deep-frying devices in which the frying fat is heated by other means than electricity. If a fossil fuel is used, the converter may comprise a heating element constructed as a burner.

We claim:

1. A deep-frying device comprising a reservoir for holding a deep-frying medium, which reservoir can be closed, a discharge device which communicates with the reservoir and which comprises a discharge channel for discharging fumes exuded during deep-frying, and a converter for converting volatile organic compounds contained in the fumes into carbon dioxide and water, wherein the discharge channel communicates with the ambience upstream of an outlet opening of the discharge channel via at least one passage, for the admixture of ambient air to the fumes exuded during deep-frying.

2. A deep-frying device as claimed in claim 1, wherein the converter is disposed in the discharge channel and said passage communicates with the ambience upstream of the converter.

3. A deep-frying device as claimed in claim 1, wherein the converter is disposed in the discharge channel and said passage communicates with the ambience downstream of the converter.

4. A deep-frying device as claimed in claim 1, wherein the converter is disposed in the discharge channel and the discharge channel has two passages, of which one passage is disposed downstream and the other passage is disposed upstream of the converter.

5. A deep-frying device as claimed in claim 1, wherein the discharge device comprises a fan for the forced supply of ambient air to the discharge channel.

6. A deep-frying device as claimed in claim 1, wherein the converter is heated by a heating element.

7. A deep-frying device as claimed in claim 1, wherein the discharge device comprises a heating element for heating the ambient air.

8. A deep-frying device as claimed in claim 1, wherein the converter is a catalytic converter.

9. A deep-frying as claimed in claim 1 in which at least a part of the discharge device is constructed as a converter unit which is detachable from the deep-frying device.

10. A deep-frying device as claimed in claim 9, wherein the discharge device comprises a housing section which is fixedly connected to the reservoir, and a housing section which is detachably connected to the reservoir, which housing sections communicate with one another in the assembled condition, the fixed housing section having a passage for the ambient air and including the heating element, and the detachable housing section includes the catalytic converter.

11. A deep-frying device as claimed in claim 1, wherein the discharge device is disposed in or on a lid for closing the reservoir.

12. A deep-frying device as claimed in claim 10, wherein the discharge channel is surrounded by the housing sections for the admixture of the ambient air, the fan being disposed in the fixed housing section upstream of the passage of the discharge channel, and between the discharge channel and the housing section an intermediate space is formed, which space communicates with the outlet opening of the discharge channel downstream of the catalytic converter, for the admixture and cooling of the emergent fumes.

13. A deep-frying device as claimed in claim 12, wherein the heating element is disposed in the passage of the discharge channel.

14. A deep-frying device as claimed in claim 1, in which the discharge device is integrated in a hinge between the reservoir and a lid for closing the reservoir.

15. A converter unit for use in a deep-frying device as claimed in claim 1, wherein the discharge channel extends through a housing section, a detachable or water-resistant converter in the discharge channel, and a connection for detachably connecting the converter unit to a deep-frying device.

16. A converter unit as claimed in claim 15, in which the connection for detachably connecting the converter unit to a deep-frying device comprises a sealing rim for sealing engagement with an upper rim of the reservoir of the deep-frying device.

* * * * *